US007926074B2

(12) United States Patent
Woodhouse et al.

(10) Patent No.: US 7,926,074 B2
(45) Date of Patent: Apr. 12, 2011

(54) BROADCAST DATA RECEIVER SYSTEM

(75) Inventors: David Woodhouse, Haworth (GB); Michael Steval, Otley (GB); Andrew Bee, Keighley (GB); Gerard Smith, Bingley (GB)

(73) Assignee: Pace Plc., Saltaire, Shipley (GB)

( * ) Notice: Subject to any disclaimer, the term of this patent is extended or adjusted under 35 U.S.C. 154(b) by 1794 days.

(21) Appl. No.: 10/468,426

(22) PCT Filed: Jul. 26, 2001

(86) PCT No.: PCT/GB01/03373
§ 371 (c)(1),
(2), (4) Date: Dec. 10, 2003

(87) PCT Pub. No.: WO02/067585
PCT Pub. Date: Aug. 29, 2002

(65) Prior Publication Data
US 2004/0088738 A1     May 6, 2004

(30) Foreign Application Priority Data

Feb. 16, 2001   (GB) .................................. 0103830.6

(51) Int. Cl.
*H04N 7/173* (2006.01)
*H04N 7/16* (2006.01)
(52) U.S. Cl. .......... 725/24; 725/106; 725/107; 725/122; 725/141
(58) Field of Classification Search ................ 725/24, 725/141, 106, 122, 107
See application file for complete search history.

(56) References Cited

U.S. PATENT DOCUMENTS

| | | | | |
|---|---|---|---|---|
| 4,057,829 A | * | 11/1977 | Moorehead | 725/114 |
| 5,381,477 A | * | 1/1995 | Beyers et al. | 380/231 |
| 5,610,916 A | * | 3/1997 | Kostreski et al. | 370/487 |
| 5,748,732 A | * | 5/1998 | Le Berre et al. | 380/229 |
| 6,195,642 B1 | * | 2/2001 | Izumi et al. | 705/1 |
| 6,546,091 B1 | * | 4/2003 | Wehmeyer et al. | 379/93.29 |
| 6,681,000 B1 | * | 1/2004 | Moriguchi et al. | 379/90.01 |
| 6,904,522 B1 | * | 6/2005 | Benardeau et al. | 713/156 |
| 7,058,802 B1 | * | 6/2006 | Epstein et al. | 713/150 |
| 2001/0012338 A1 | * | 8/2001 | Frank et al. | 379/90.01 |
| 2003/0028886 A1 | * | 2/2003 | Wang et al. | 725/78 |

FOREIGN PATENT DOCUMENTS

| | | |
|---|---|---|
| EP | 0550959 A1 | 7/1993 |
| EP | 0949781 A1 | 10/1999 |
| WO | WO98/26593 | 6/1998 |

* cited by examiner

*Primary Examiner* — Christopher Kelley
*Assistant Examiner* — Franklin S Andramuno
(74) *Attorney, Agent, or Firm* — Head, Johnson & Kachigian, P.C.

(57) ABSTRACT

A broadcast data receiver system is provided and a method of operating the system. The system includes a first broadcast data receiver (BDR) (2) located at a first location, typically in a premises. The BDR (2) receives video, audio and/or auxiliary digital data broadcast from a remote location via cable, satellite or terrestrial means. The BDR processes the data and displays the processed data on a display screen (10) and/or audio data via speakers connected thereto. At least a second broadcast data receiver (8) is provided at least a second location typically in the same premises. One of the first and second BDRs (2, 8) is made functional by a signal received from the other of the first and second BDRs, via a telecommunications line (4) provided in the premises and connecting the first and at least second BDRs together, thereby ensuring that both BDRs are connected before operation of the two BDRs can be achieved.

13 Claims, 1 Drawing Sheet

BROADCAST DATA RECEIVER SYSTEM

RELATES BACK

This application is the National Phase of PCT Application Ser. No. GB01/03373 filed 26 Jul. 2001 which claims priority from British Patent Application No. 0103830.6 filed 16 Feb. 2001.

BACKGROUND OF THE INVENTION

The present invention relates to a broadcast data receiver system comprising a first and at least a second broadcast data receiver in communication therewith.

Broadcast data receivers (BDR's) are used in television systems to receive digital data broadcast from a broadcaster at a remote location via cable, satellite and/or terrestrial means and process the digital data for display on a display screen or sounding via speakers connected thereto. The number of program channels available via digital television systems is far greater than the number of programs available using analogue systems and, as such, digital television is becoming increasingly popular. As a result, it is becoming common for users to have two or more BDR's in their homes, for use with two or more television display screens. To encourage user's to provide a BDR with each of the televisions in the premises of the home, some broadcasters are providing a free or discounted second BDR to existing customers.

The second BDR is typically a complete receiver unit, similar or identical to the first BDR and capable of receiving data from a broadcaster, processing the data for display, having a smartcard and/or the like. However, a problem facing broadcasters who provide two or more BDR's to a customer is that the two BDR's may be used in different premises, thereby allowing a user to give or sell one of the BDR's to a friend, neighbour or similar. This reduces the broadcaster's revenue due to lost subscriptions and is therefore undesirable.

One method being used by broadcasters to try and overcome this problem is to provide an RS232 data connection (standard external modem) between the two BDR's to ensure that they are being used in conjunction with each other in the same premises. However, a problem with this method is that it requires adapters and additional cabling to be fitted to the BDRs which is expensive and is therefore less likely to persuade a customer to have more than one BDR. In addition, it is not entirely foolproof as an extended connection can be provided between the two BDR's to allow the BDR's to be used in different premises, thereby still resulting in the initial problem faced by the broadcasters.

SUMMARY OF THE INVENTION

It is therefore an aim of the present invention to provide a system wherein the broadcaster can ensure that two or more of their BDR's are being used in the same customer premises/at the same customers address.

According to a first aspect of the present invention there is provided a broadcast data receiver system comprising a first broadcast data receiver (BDR) located at a first location, said BDR receiving video, audio and/or auxiliary digital data broadcast from a remote location via cable, satellite or terrestrial means, said BDR processing said data and displaying said processed data on a display screen and/or audio data via speakers connected thereto, and at least a second BDR provided at at least a second location, characterised in that one of said first and second BDRs is made functional by a signal received from the other of said first and second BDRs via communication means connecting the first and at least second BDRs together.

Preferably the first and at least second BDR are provided in the same premises.

Preferably the communication means is a telecommunications line.

Preferably one of the first and at least second BDR has to be enabled by the other(s) of the first and at least second BDRs in order to perform one or more functions, such as receiving data, processing data, displaying data and/or the like.

Preferably the telephone line is a functional Public Switched Telephone Network (PSTN) connection.

Preferably the first and at least second BDR are connected via the telephone line in parallel.

Preferably the at least one other BDR is provided with a timer such that the BDR will only function for a limited period of time upon activation unless the timer is reset.

Preferably resetting of the timer is provided by the input of an authorisation code into the BDR.

Preferably the authorisation code is communicated to at least one of the BDRs from the broadcast ("head end") transmitter.

Further preferably the authorisation code is communicated to the other BDRs from the first BDR via the telephone line within the premises. The authorisation code can be regularly changed at the head end of the BDR software if required.

In one embodiment, communication between the first and at least one other BDR is allowed when both BDR's are enabled by the broadcast "head end".

Further preferably the broadcast head end allows communication for a pre-determined period of time.

Preferably a communication sequence is initiated by the second BDR on receipt of a message from the broadcast head end transmitter.

It can be seen that without regular communication between the first and at least second BDR's, the at least second BDR will not function after the period of time set by the timer has expired.

According to a second aspect of the present invention there is provided a method of operating a broadcast data system, said system comprising a first BDR located at a first location, said BDR receiving video, audio and/or auxiliary digital data broadcast from a remote location, and at least a second BDR located at at least a second location, said first and at least second BDR connected together via a telecommunications line, characterised in that said method includes the steps of the first BDR monitoring the line status, the at least second BDR taking the telecommunications line off the hook when operation of the at least second BDR is required, said first BDR detecting a change in line status and then initiating communication between said first BDR and said at least second BDR, thereby allowing the at least second BDR to become operational.

Preferably the first and at least second BDR are provided in the same premises.

Preferably the first BDR communicates an authorisation signal to the second BDR to the second BDR to operate.

Preferably the telephone line status is monitored by monitoring the line voltage therein.

An advantage of the present invention is that a telephone line typically already in the premises can be used to implement communication between the first and at least second BDR, such that there is no requirement for extra adaptors and cabling. The present invention therefore provides an inexpensive solution which is secure and robust. The modulation method used to transfer data between the two BDR's is a standard modulation technique, such as Frequency Shift Keying (FSK) or line current modulation. This allows the existing BDR modems to be used without modification and to prevent adverse disruption of the telephone network or exchange.

DESCRIPTION OF THE PREFERRED EMBODIMENTS

Figure 1:
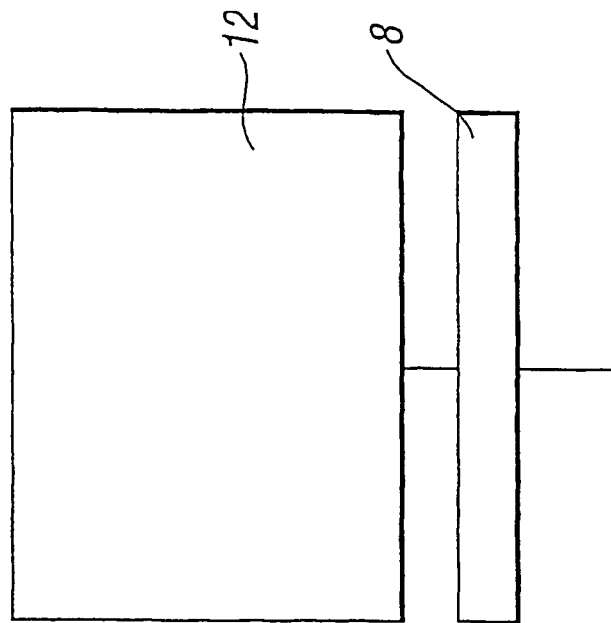
FIG. 1 is a schematic view of the broadcast data receiver system according to the present disclosure.
Figure 1:
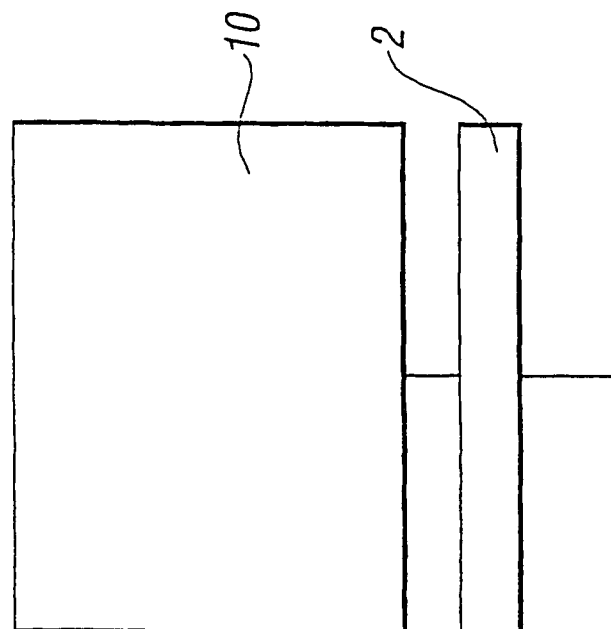
Figure 1:
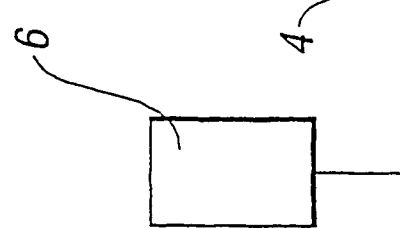

An embodiment of the present invention will now be described with reference to the accompanying FIG. 1 wherein:

It has become an increasing problem that where broadcasters provide two or more BDR's to customers, the two BDRs may be used in different premises, thereby allowing a user to give or sell one of the BDR's to a third party but only a single subscription be paid to the broadcaster. This is a problem which the present invention overcomes.

A first BDR 2 is normally connected to a user's live telephone line 4 via a local wall socket 6. In accordance with the present invention, a second BDR 8 is also connected to the same telephone line in parallel via a standard extension socket point within the user's premises.

The first and second BDRs are typically located at different locations within the user's premises and both BDRs are connected to television display screens 10 and 12 respectively.

The first BDR 2 monitors the telephone line status using a conventional line voltage measurement method. For example, the voltage on the telephone line 4 can be measured every 300 mS using a capacitor charge discharge technique.

The broadcast "head end" initiates a communication sequence between the first BDR 2 and the second BDR 8 by transmitting a unique secure message (EMM) within the datastream to both BDRs simultaneously.

One receipt of this message, the second BDR 8 attempts to communicate with the first BDR 2, which is also now primed to respond to the change in telephone line voltage. This "primed" period is typically enabled for only a few seconds to enhance security and to prevent false triggering of communication between the BDRs caused as a result of normal telephone use.

To initiate communication with the first BDR 2, the second BDR 8 sends a signal along the telephone line 4, which in effect, takes the phone off the hook/"seizes" the line. This results in a drop in the telephone line voltage, which is detected by the first BDR, and results in initiation of communication between the first BDR and the second BDR.

In the embodiment described, the second BDR will only attempt to respond to the first BDR provided that it has been enabled by the broadcaster receiving the appropriate EMM.

The two BDR's communicate with each other using a modulation technique which does not interact with the telephone exchange and which is available via the existing BDR modem. For example, Frequency Shift Keying (FSK) can be used which allows the transfer of digital data between the BDR's but will not falsely dial the telephone exchange. Alternatively, line current modulation can be used and this has the advantage that a full modem is not required to be incorporated within the second BDR 8.

The second BDR 8 includes a timer built into the software such that operation of the BDR is for a limited period of time only. After the limited period of timer has expired, the timer of the second BDR 8 needs to be reset using an authorisation code provided by the first BDR 2 in order for BDR 8 to function.

For example, the BDR timer can be set for a period of 72 hours, after which time the BDR will cease to function normally unless the timer is reset.

The authorisation code can be set via the first BDR and can be regularly changed at the head end of the BDR's software, thereby reducing the likelihood of the code being deciphered and used to bypass the system. The code can also be sent from the broadcaster to one of the receivers or during a normal telephone dial-up communication.

Normal user telephone usage is not effect by the system of the present invention.

Thus it can be seen that the present invention provides communication between at least two broadcast data receivers via connection of the receivers to the same telephone line to allow operation of at least one the receivers. Communication between the two receivers only takes place when one of the broadcast data receivers detects the presence of the other on the telephone line. The system is secure and cannot be easily bypassed as is the case with conventional systems.

The invention claimed is:

1. A broadcast data receiver system, said system comprising:
    a first broadcast data receiver located at a first location in a premises, receiving video, audio and/or auxiliary digital data broadcast from a remote location via cable, satellite or terrestrial means and processing and displaying said data on a display screen and/or audio data via speakers connected thereto;
    at least a second broadcast data receiver provided at at least a second location in the same premises as said first broadcast data receiver;
    said premises being provided with a telephone line and at least two access points to said telephone line;
    said first and said at least second broadcast data receivers together being connected to said telephone line in parallel via respective access points;
    one of said first and second broadcast data receivers being made functional to receive broadcast data by a signal received from the other of said first and second broadcast data receiver via the telephone line;
    said signal only being transmitted after an authorization code has been communicated to at least one of said first and said at least second broadcast data receivers from a broadcast head end transmitter, said authorization code priming the broadcast data receivers to allow communication therebetween via said telephone line for a limited period; and
    said first and said at least second broadcast data receivers are provided in a same premise and are registered to the same user, such that use of the broadcast data receivers independently in different premises is prevented by the requirement for periodic authorization via the telephone line in said same premise.

2. A system according to claim 1 wherein said telephone line is a functional public switched telephone network line.

3. A system according to claim 1 wherein said at least one of said first and said second broadcast data receivers is provided with timer means having reset capabilities such that the broadcast data receivers(s) will function for a limited period only following receipt of a signal from the other of said broadcast data receivers. unless the timer means is reset.

4. A system according to claim 3 wherein said timer means is reset by inputting of an authorization code in said broadcast data receiver.

5. A system according to claim 1 wherein said authorization code is changed at regular intervals at said broadcast head end transmitter.

6. A system according to claim 1 wherein said broadcast head end transmitter enable said first and said at least second broadcast data receivers for a limited period time.

7. A system according to claim 1 wherein a communication sequence is initiated in one of said first and said at least second broadcast data receiver(s) on receipt of an enabling signal from said broadcast head end transmitter.

8. A system according to claim 1 wherein said first and said at least second broadcast data receivers communicate using frequency shift keying.

9. A system according to claim 1 wherein said first and said at least second broadcast data receivers communicate using line current modulation.

10. A method of operating a broadcast data system, said system comprising the steps of:
- a first broadcast data receiver located at a first location receiving video, audio and/or auxiliary digital data broadcast from a remote location, at least a second broadcast data receiver being located at at least a second location wherein said first and said at least second broadcast data receives are registered to the same user;
- said first and at least second broadcast data receivers being located in a same premise and connected to respective access points for a telephone line within the premise to allow communication between the broadcast data receivers;
- said communication only being allowed for a limited period after an authorization code has been communicated from a broadcast head end transmitter to at least one of said first and said at least second broadcast data receivers;
- said first broadcast data receiver monitoring the telephone line for change in voltage;
- at least second broadcast data receiver taking the telephone line off a hook when operation of the at least second broadcast data receiver is required; and
- said first broadcast data receiver detecting a change in the telephone line status and then initiating communication between said first broadcast data receiver and said at least second broadcast data receiver, thereby allowing the at least second broadcast data receiver to become operational to receive broadcast data.

11. A method according to claim 10 wherein said first broadcast data receiver communicates an authorization signal to said second broadcast data receiver to allow said second broadcast data receiver to become operational.

12. A method according to claim 10 wherein said first broadcast data receiver does not initiate communication with said at least second broadcast data receiver until a broadcast head end transmitter has enable both said first and said at least second broadcast data receiver.

13. A broadcast data receiver system, said system comprising:
- a first broadcast data receiver located at a first location in a premise receiving video, audio and/or auxiliary digital data broadcast from a remote location via cable, satellite or terrestrial means and processing and displaying said data on a display screen and/or audio data via speakers connected thereto;
- at least a second broadcast data receiver provided at at least a second location in the same premise as said first broadcast data receiver;
- said premise being provided with a telephone line and at least two access points to said telephone line; p1 said first and said at least second broadcast data receivers being connected together in parallel using said telephone line via respective access points;
- one of said first and second broadcast data receiver being made functional by a signal received from the other of said first and second broadcast data receiver via the telephone line;
- an authorization code being communicated to at least one said first and said at least second broadcast data receivers from a broadcast head end transmitter;
- once said at least one broadcast data receiver receives said authorization code, the authorization code is communicated to one or more other said broadcast data receivers via said telephone line in the premise; and
- said at least one of said first and said second broadcast data receivers is provided with a timer having reset capabilities such that the broadcast data receivers(s) will function for a limited period only following receipt of a signal from the other of said broadcast data receivers, unless the timer is reset, the timer being reset by reception of an authorization code via said telephone line.

* * * * *